United States Patent [19]
Kim

[11] Patent Number: 5,638,245
[45] Date of Patent: Jun. 10, 1997

[54] ELECTRIC POWER CUT-OFF DETECTION UNIT FOR A MONITOR

[75] Inventor: Young-Min Kim, Seoul, Rep. of Korea

[73] Assignee: Daewoo Electronics Co., Ltd., Seoul, Rep. of Korea

[21] Appl. No.: 549,571

[22] Filed: Oct. 27, 1995

[30] Foreign Application Priority Data

Oct. 28, 1994 [KR] Rep. of Korea ............... 94-27887

[51] Int. Cl.$^6$ ............................................. H02H 3/14
[52] U.S. Cl. .................................... 361/86; 361/88
[58] Field of Search ........................... 361/86, 78, 88, 361/91; 348/377, 184

[56] References Cited

U.S. PATENT DOCUMENTS 4,733,158  3/1988  Marchione et al. ............ 323/258
5,430,596  7/1995  Hamaguchi et al. ............. 361/86

Primary Examiner—Jeffrey A. Gaffin
Assistant Examiner—Sally C. Medley
Attorney, Agent, or Firm—Fish & Richardson, P.C.

[57] ABSTRACT

Disclosed is an electric power cut-off detection unit for a monitor which has a full-wave rectifier for generating a first direct voltage, a second voltage generator for generating a second direct voltage, a third direct voltage generator for generating a third direct voltage, a fourth direct voltage generator for inputting the first and the third direct voltages and for outputting a fourth direct voltage according to an input of the first direct voltage, and microprocessor for inputting the third direct voltage as an operation voltage, monitoring the fourth direct voltage and for storing data concerning operation states of the monitor as safety measures according to the fourth direct voltage during inputting the third direct voltage on a power cut-off or a power failure. With such safety measures of microprocessor for the monitor, inconvenience for a user to readjust monitor's display states can be eliminated when a normal alternate electric power is resupplied and a prevention of a damage to the monitor can be achieved by eliminating a damage with a deflection circuit.

3 Claims, 4 Drawing Sheets

ELECTRIC POWER CUT-OFF DETECTION UNIT FOR A MONITOR

BACKGROUND OF THE INVENTION

1. Field of the Invention

The present invention relates to a monitor, and more particularly to an electric power cut-off detection unit for a monitor capable of preventing damage to the monitor by promptly judging an electric power cut-off.

2. Description of the Prior Art

FIG. 1 is a brief diagram for showing a conventional electric power cut-off detection unit for a monitor. As shown in FIG. 1, the conventional electric power cut-off detection unit has a full-wave rectifier 1. An alternate electric power AC, for example 110 V or 220 V, is applied to full-wave rectifier 1. Full-wave rectifier 1 full-wave rectifies alternative electric power AC and outputs a certain direct voltage DC1, for example 5 V or 12 V. Full-wave rectifier 1 is connected with a first voltage generator 2. Direct voltage DC1 of full-wave rectifier 1 is inputted to first voltage generator 2. First voltage generator 2 rectifies direct voltage DC1 and generates a direct voltage SDCC1 more stabilized than direct voltage DC1. That is, direct voltage DC1 of full-wave rectifier 1 is supplied to a regulator REG1 of first voltage generator 2. Regulator REG1 rectifies direct voltage DC1 and generates a direct voltage SDC1 more stabilized than direct voltage DC1. Regulator REG1 is connected in series with a capacitor C1. Direct voltage SDC1 of regulator REG1 is charged into capacitor C1. According to direct voltage SDC1 of regulator REG1 (direct voltage SDC1 is a voltage with ripple components), capacitor C1 repeatedly charges and discharges its charged direct voltage SDC1. Therefore, first voltage generator 2 generates direct voltage SDCC1 more stabilized than direct voltage SDC1 of regulator REG1.

First voltage generator 2 is electrically connected with a second voltage generator 3. Direct voltage SDCC1 of first voltage generator 2 is applied to second voltage generator 3. Second voltage generator 3 generates a direct voltage SDCC2 lower than direct voltage SDCC1. Direct voltage SDCC1 of first voltage generator 2 is supplied to a regulator REG2 of second voltage generator 3. Regulator REG2 lowers and regulates direct voltage SDCC1 and outputs a direct voltage SDC2 lower than direct voltage SDCC1. Regulator REG2 is electrically connected in series with a capacitor C2. Direct voltage SDC2 of regulator REG2 is charged into capacitor C2. According to direct voltage SDC2 of regulator REG2 (direct voltage SDC2 is a voltage with ripples), capacitor C2 repeatedly charges and discharges its charged direct voltage SDC2. Therefore, second voltage generator 3 generates direct voltage SDCC2 more stabilized than direct voltage SDC2 of regulator REG2. Second voltage generator 3 is electrically connected with a power cut-off detector 5. Direct voltage SDCC2 of second voltage generator 3 is supplied to power cut-off detector 5. Power cut-off detector 5 detects a variation of direct votage SDCC2, for example a variation from 5 V to 0 V, in accordance with a cut-off of alternate electric power AC and outputs a detection signal CUT5. That is, as shown in FIG. 1, direct voltage (SDCC2) of second voltage generator 3 is divided by resistors R1 and R2 of power cut-off detector 5. A voltage VR2 across resistor R2 is applied to the inverting terminal of a comparator COM. Further, direct voltage SDCC2 of second voltage generator 3 is charged into a capacitor C3 through a resistor R3 and a diode D1 of power cut-off detector 5. A voltage VC3 charged in capacitor C3 is applied to the non-inverting terminal of comparator COM. Comparator COM compares voltage VR2 of resistor R2 with voltage VC3 of capacitor C3 and outputs detection signal CUT5. Detection signal CUT5 is applied to a microprocessor 4 built in a monitor. On a power cut-off of alternate electric power AC, comparator COM outputs a high level, for example 5 V, as detection signal CUT5 to microprocessor 4 since voltage VR2 of resistor R2 is lowered to a low level, for example 0 V, and voltage VC3 of capacitor C3 is maintained to a high level, for example direct voltage SDCC2. According to an input of detection signal CUT5 of the high level, microprocessor 4 stores data processed at present, for example contrast data, picture size data and chip data in a deflection coil, for preventing data loss inputted till now by user or data breakage in chip of the deflection coil. When alternate electric power AC is normally supplied, comparator COM outputs a voltage of a low level as detection signal CUT5 to microprocessor 4 since voltage VR2 of resistor R2 and voltage VC3 of capacitor C3 are respectively maintained to a high level, for example direct voltage SDCC2. According to an input of the voltage of the low level, microprocessor 4 continues to perform its present operations. U.S. Pat. No. 4,733,158 describes a power supply, in which the power supply has a function of controlling its output voltage according to the variations of input voltages.

There exists a drawback in that such a conventional electric power cut-off detection unit has its complicated construction since a comparator and a diode should be employed for detecting a cut-off of electric power. Further, there exists a drawback in that a time period is short for a microprocessor to take safety measures on a power cut-off since the power cut-off is detected with a voltage outputted from a second regulator.

SUMMARY OF THE INVENTION

Accordingly, it is an object of the present invention to provide an electric power cut-off detection unit for a monitor capable of increasing a time period for a microprocessor to take safety measures of a monitor.

It is another object of the present invention to provide an electric power cut-off detection unit for a monitor having a simplified construction.

In order to achieve the above objects, the electric power cut-off detection unit for a monitor according to the present invention includes a first voltage generator. The first voltage generator rectifies an alternate electric power and generates a first direct voltage of a certain level. The first direct voltage is inputted to a second voltage generator. The second voltage generator equalizes the first direct voltage and generates a second direct voltage of a certain level. The second direct voltage is inputted to a third voltage generator. The third voltage generator equalizes the second direct voltage and generates a third direct voltage of a certain level. The first and the third direct voltages are applied to a fourth voltage generator. The fourth voltage generator generates substantially the third direct voltage or 0 V as an output voltage according to the first direct voltage. The output voltage of the fourth voltage generator is supplied to a microprocessor. The microprocessor inputs the third direct voltage of the third voltage generator as an operation voltage. The microprocessor monitors an output voltage of the fourth voltage generator and stores operation state data of the monitor during inputting the operation voltage until the microprocessor detects 0 V as the output voltage of the fourth voltage generator.

With the safety measures of the microprocessor for the monitor, inconvenience for a user to readjust monitor's display states can be eliminated when a normal alternate electric power is resupplied and a prevention of damage to the monitor can be achieved by eliminating a damage with a deflection circuit.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Description will be made in detail hereinafter on an electric power cut-off detection unit for a monitor according to an embodiment of the present invention in reference with accompanying drawings.

Figure 1:
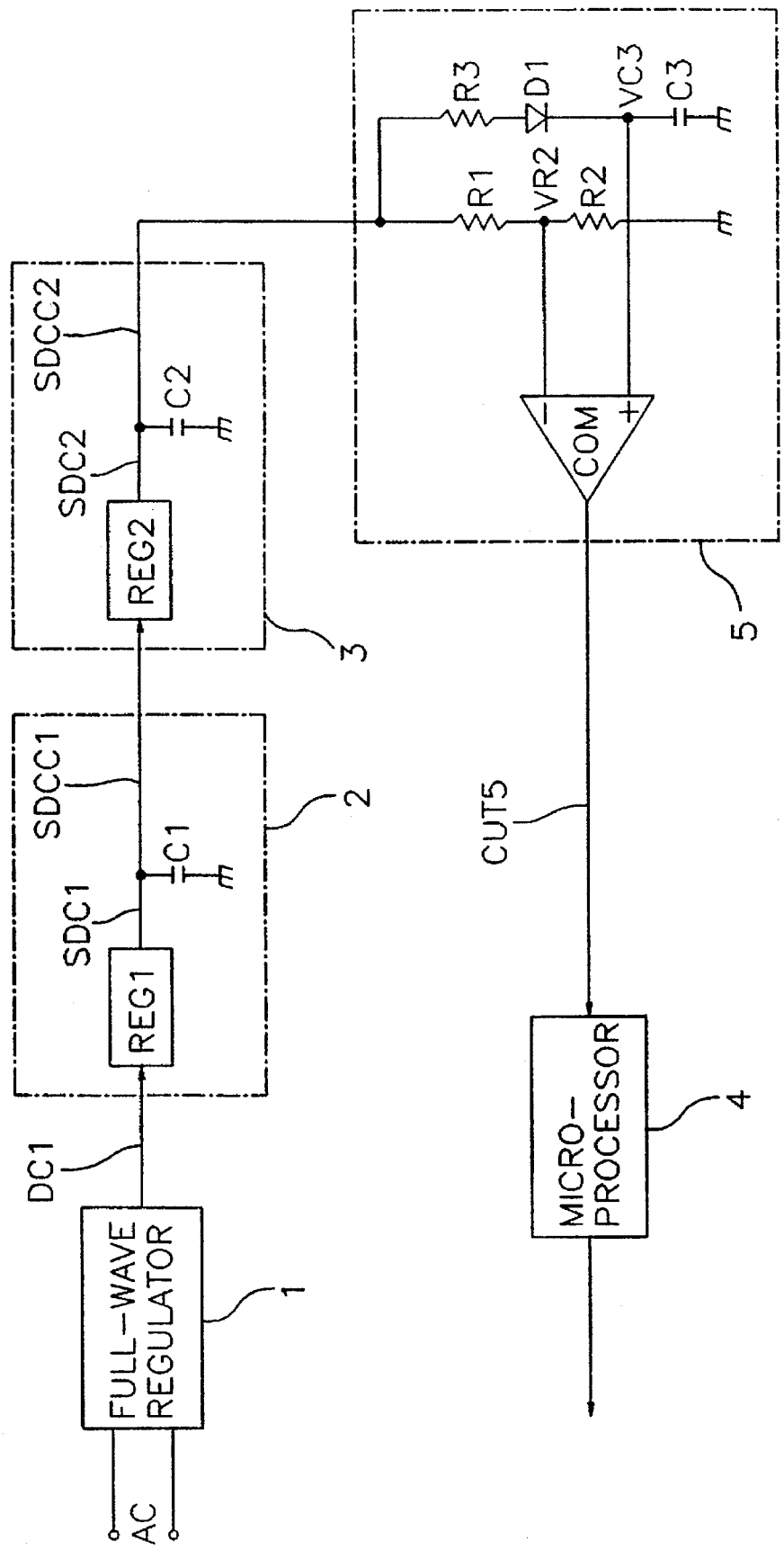
FIG. 1 is a block diagram for showing a conventional electric power cut-off detection unit for a monitor.
Figure 2:
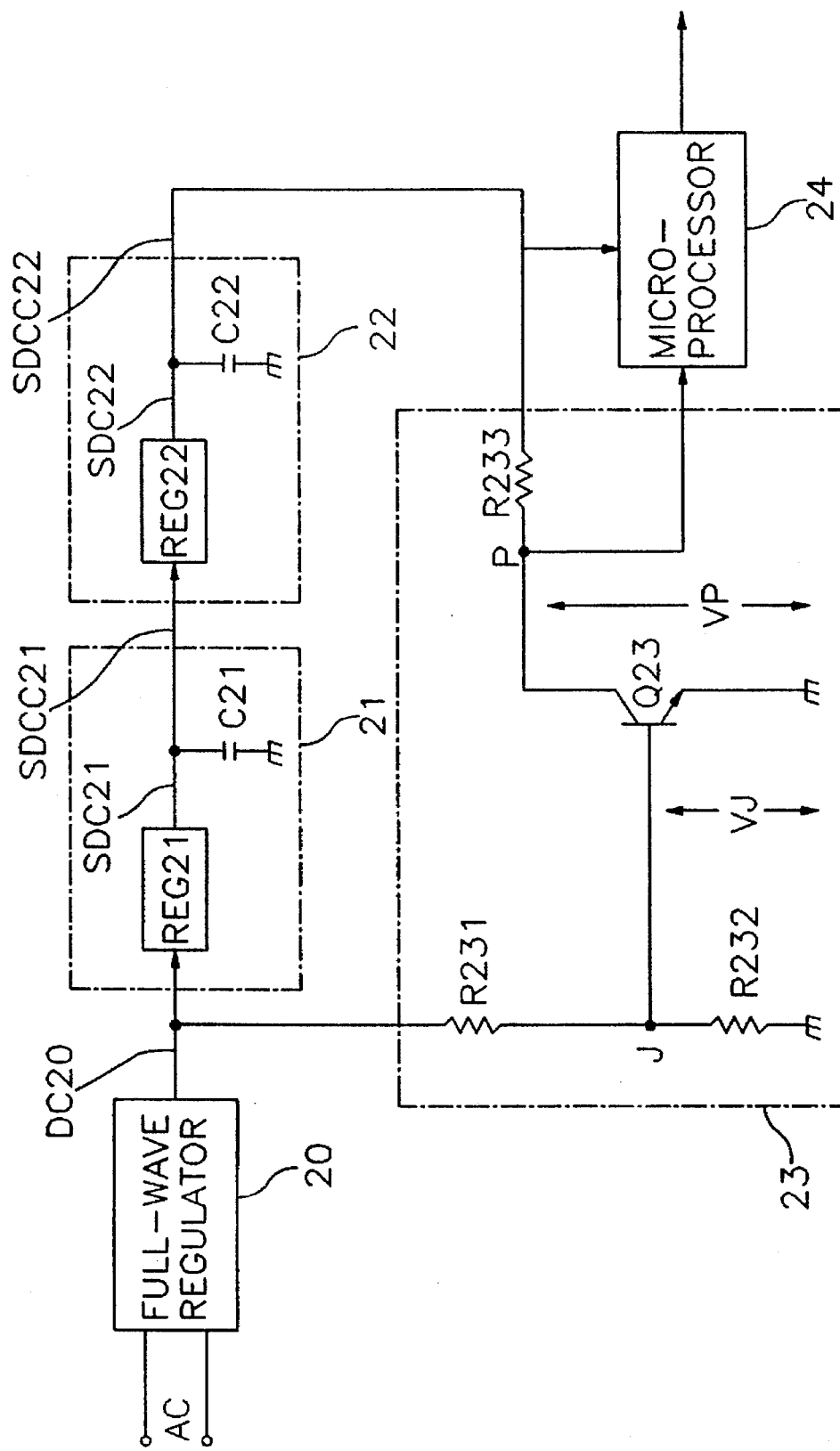
FIG. 2 is a block diagram for showing an electric power cut-off detection unit for a monitor according to an embodiment of the present invention.

FIG. 2 is a block diagram for showing the electric power cut-off detection unit for a monitor according to an embodiment of the present invention. As shown in FIG. 2, an electric power cut-off detection unit for a monitor according to an embodiment of the present invention includes a full-wave rectifier 20. An alternate electric power AC, for example 110 V or 220 V, is applied to full-wave rectifier 20. Full-wave rectifier 20 full-wave rectifies alternate electric power AC and outputs a direct voltage DC20 of a certain level, for example 5 V or 12 V. Full-wave rectifier 20 is electrically connected with a first voltage generator 21. Direct voltage DC20 of full-wave rectifier 20 is supplied to first voltage generator 21. First voltage generator 21 rectifies direct voltage DC20 and generates a direct voltage SDCC21 more stabilized than direct voltage DC20. That is, direct voltage DC20 of full-wave rectifier 20 is supplied to a regulator REG21 of first voltage generator 21. Regulator REG21 rectifies direct voltage DC20 and generates direct voltage SDC21 more stabilized, that is, having less ripples than direct voltage DC20. Regulator REG21 is connected in series with a capacitor C21. Direct voltage SDC21 of regulator REG21 is charged into capacitor C21. Direct voltage SDC21 of capacitor C21 is charged and discharged according to direct voltage SDC21 of regulator REG21. Accordingly, first voltage generator 21 generates direct voltage SDC21 more stabilized than direct voltage SDC21 of regulator REG21.

First voltage generator 21 is electrically connected with a second voltage generator 22. Direct voltage SDCC21 of first voltage generator 21 is applied to second voltage generator 22. Second voltage generator 22 generates a different voltage, for example direct voltage SDCC22 lower than direct voltage SDCC21, from direct voltage SDCC21 of first voltage generator 21. That is, direct voltage SDCC21 of first voltage generator 21 is applied to a regulator REG22 of second voltage generator 22. Regulator REG22 lowers and rectifies direct voltage SDCC21 and outputs a direct voltage SDC22 lower than direct voltage SDCC21. Regulator REG22 is electrically connected in series with a capacitor C22. Direct voltage SDC22 of regulator REG22 is charged in capacitor C22. According to direct voltage SDC22 of regulator REG22, which has ripple components, direct voltage SDC22 charged in capacitor C22 is repeatedly charged and discharged. Therefore, second voltage generator 22 generates a direct voltage SDCC22 more stabilized, that is, having less ripples than direct voltage SDC22 of regulator REG22. Further, full-wave rectifier 20 is electrically connected with an electric power cut-off detector 23. Direct voltage DC20 of full-wave rectifier 20 is applied to resistors R231 and R232 at electric power cut-off detector 23. Resistor R231 is connected in series with resistor R232. Accordingly, direct voltage DC20 is divided by resistors R231 and R232. The juncture of resistors R231 and R232 is connected with the base of a transistor Q23. A voltage VJ across resistor R232 is supplied to the base of transistor Q23. The emitter of transistor Q23 is grounded and the collector thereof is connected with capacitor C22 of second voltage generator 22 through a resistor R233. Accordingly, direct voltage SDCC22 of second voltage generator 22 is applied to the collector of transistor Q23. Microprocessor 24 of the monitor is electrically connected with a juncture P between the collector of transistor Q23 and resistor R233 and detects a voltage VP of the juncture P. Direct voltage SDCC22 of second voltage generator 22 is applied to microprocessor 24 as an operation voltage thereof.

Operations will be described in detail hereinafter on the electric power cut-off detection unit for the monitor according to an embodiment of the present invention in reference with accompanying drawings.

Figure 3:
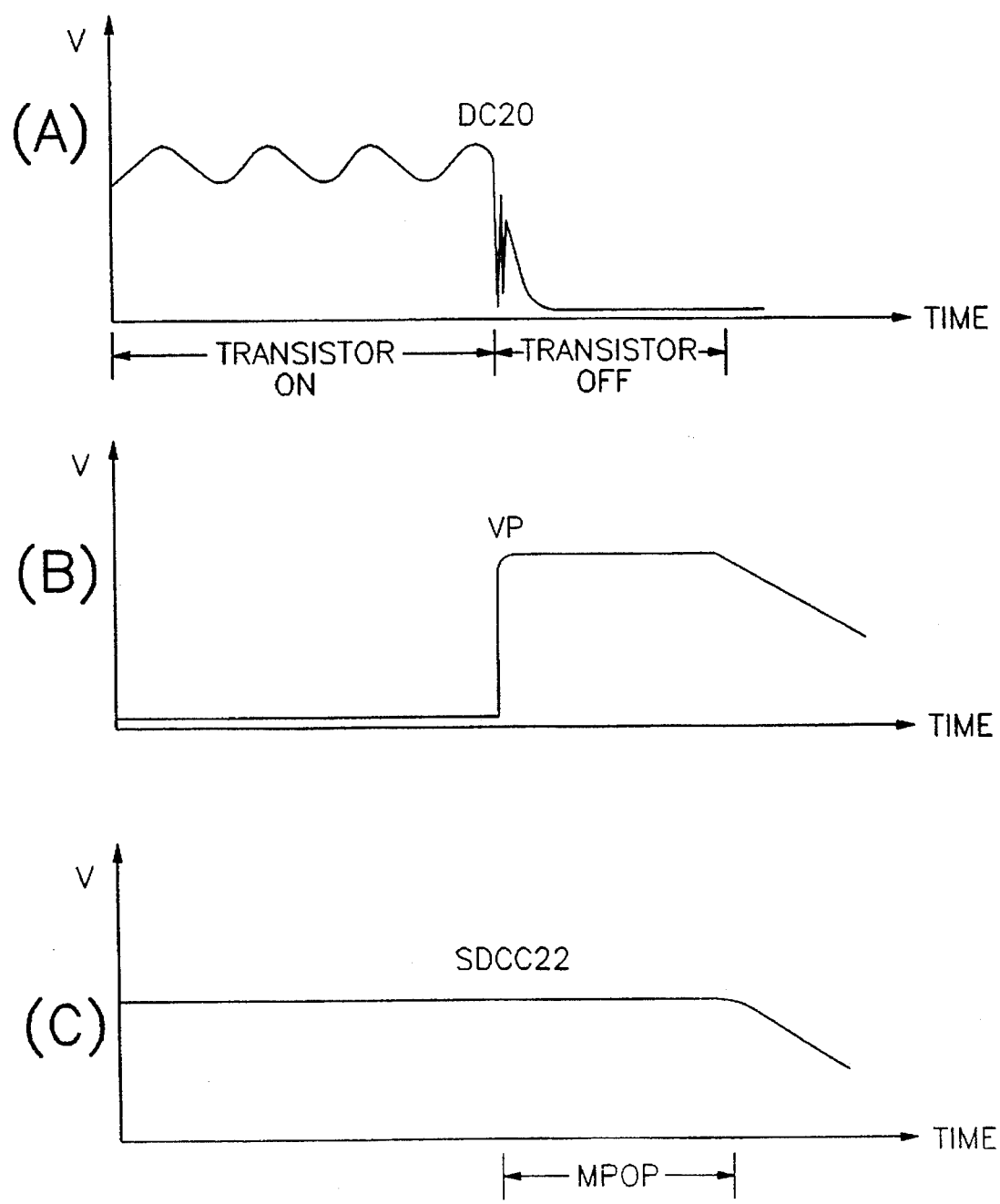
FIG. 3 is a view for showing waveforms for explaining operations of the electric power cut-off detection unit of FIG. 2.

FIG. 3 is a view for showing waveforms for explaining operations of the electric power cut-off detection unit for the monitor, according to an embodiment of the present invention. As shown in (A) of FIG. 3, when a normal alternate electric power AC is applied to full-wave rectifier 20 (TRANSISTOR ON section), full-wave rectifier 20 generates direct voltage DC20 of a high level, for example 12 V. With direct voltage DC20 of a high level from full-wave rectifier 20, voltage VJ across resistor R232 turns transistor Q23 on. At the time transistor Q23 is turned on, as shown in (B) of FIG. 3, a collector voltage VP of transistor Q23 goes down to a low level, for example 0 V. Microprocessor 24 detects the low level of collector voltage VP and determines that an input of alternate electric power AC is normal. As shown in (C) of FIG. 3, microprocessor 24 continues to perform present operations since direct voltage SDCC22 continues to be applied to microprocessor 24 as an operation voltage thereof.

In the meantime, as shown in (A) of FIG. 3, when an alternate electric power AC is cut off of failing (TRANSISTOR OFF section), full-wave rectifier 20 outputs direct voltage DC20 of a low level, for example 0 V. Therefore, voltage VJ across resistor R232 turns transistor Q23 off. When transistor Q23 is turned off, as shown in (B) of FIG. 3, collector voltage VP of transistor Q23 goes up to a high level, for example 5 V. Microprocessor 24 detects the high level of collector voltage VP and determines that alternate electric power AC is cut off or failing. As shown in (C) of FIG. 3, although alternate electric power AC is cut off or failing, microprocessor 24 can take necessary safety measures of the monitor during a certain time period since direct voltage SDCC22 continues to be applied to microprocessor 24 for the certain time period (MPOP section).

Figure 4:
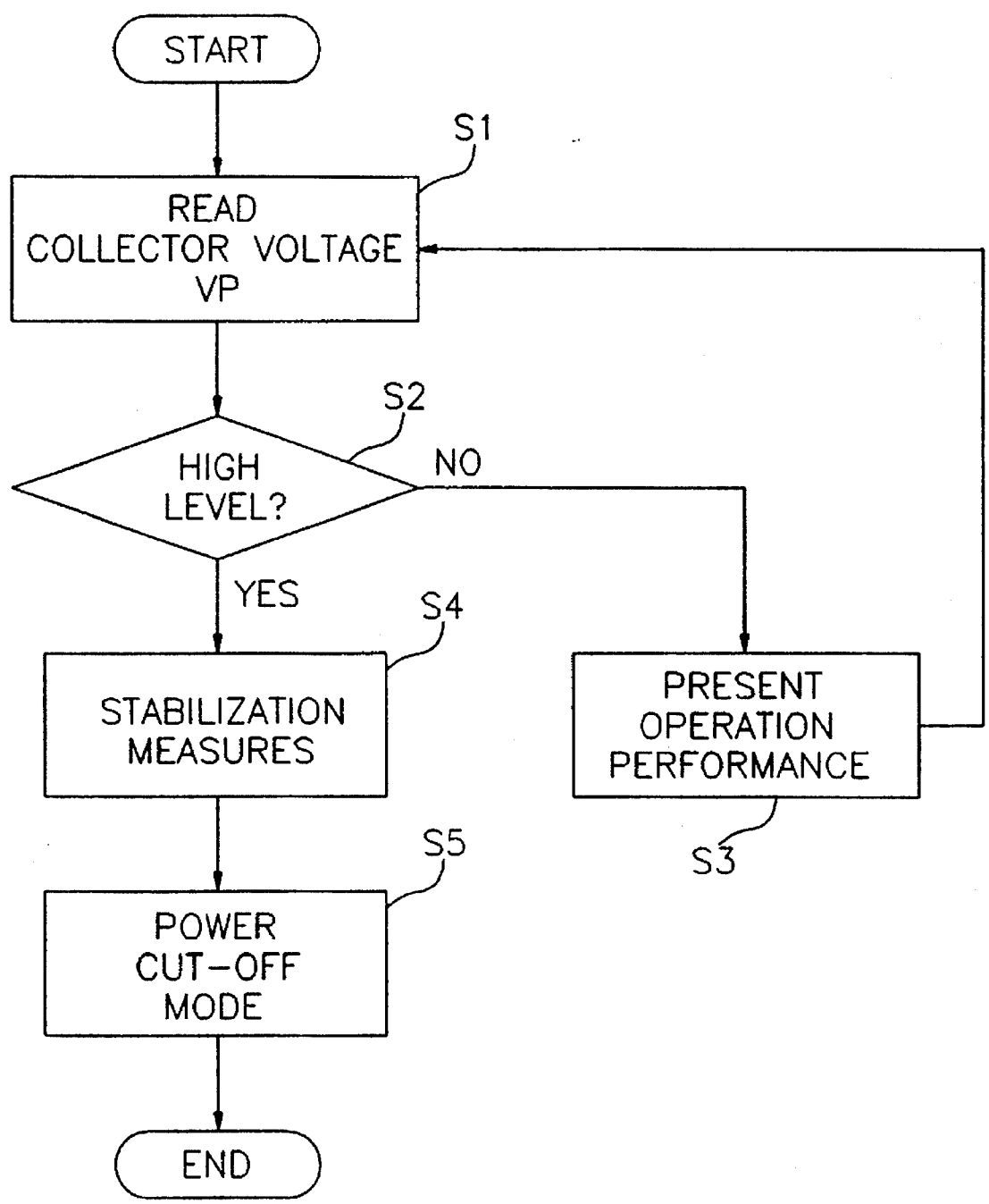
FIG. 4 is a flow chart for explaining operations of a microprocessor of FIG. 2.

FIG. 4 is a flow chart for explaining operations of the microprocessor 24. As shown in FIG. 4, microprocessor 24 reads collector voltage VP of transistor Q23 (step S1). Microprocessor 24 judges whether collector voltage VP is a high level (step S2). When microprocessor 24 determines that collector voltage VP is a low level, microprocessor 24 continues to perform present operations (step S3) and reads collector voltage VP again (step S1). When microprocessor 24 determines that collector voltage VP is a high level, microprocessor 24 takes necessary safety measures (step S4) and enters a power cut-off mode to stop its operations (step S5). The necessary safety measures of microprocessor 24 are to prevent data from being destroyed by storing in microprocessor 24 data relating to contrast, picture size, picture shift, brightness, etc., and by storing horizontal/vertical deflection data in a chip, which is in a deflection circuit built in the monitor in general.

With such safety measures of microprocessor 24 for the monitor, inconvenience for a user to readjust monitor's display states can be eliminated when a normal alternate electric power is resupplied and a prevention of a damage to the monitor can be achieved by eliminating a damage with a deflection circuit.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. An electric power cut-off detection unit for a monitor, comprising:

a first voltage generator for generating a first direct voltage by full-wave rectifying an alternate electric power inputting from the outside;

a second voltage generator for generating a second direct voltage by regulating and equalizing the first direct voltage;

a third voltage generator for generating a third direct voltage by regulating and equalizing the second direct voltage;

a fourth voltage generator for inputting the first and the third direct voltages and for generating a fourth direct voltage corresponding to substantially the third direct voltage or substantially 0 V according to an input of the first direct voltage; and a microprocessor for inputting the third direct voltage of said third voltage generator as an operation voltage thereof, monitoring the fourth direct voltage, and for storing data concerning operation states of the monitor during inputting the operation voltage until said microprocessor detects substantially 0 V as the fourth direct voltage.

2. The electric power cut-off detection unit as claimed in claim 1, wherein said fourth voltage generator includes:

first and second resistors connected in series with each other for dividing the first direct voltage of said first voltage generator and for generating a divided voltage;

a third resistor connected with an output terminal of the third direct voltage of said third voltage generator; and a transistor for generating the fourth direct voltage according to an input of the divided voltage, a base of said transistor being connected with a juncture of said first and second resistors, a collector of said transistor being connected with said third resistor and an emitter of said transistor being grounded.

3. The electric power cut-off detection unit as claimed in claim 1, wherein said data concerning operation states of the monitor include horizontal and vertical deflection data of the monitor.

* * * * *